US010068588B2

(12) United States Patent
Khan et al.

(10) Patent No.: US 10,068,588 B2
(45) Date of Patent: Sep. 4, 2018

(54) REAL-TIME EMOTION RECOGNITION FROM AUDIO SIGNALS

(71) Applicant: MICROSOFT CORPORATION, Redmond, WA (US)

(72) Inventors: Yaser Khan, Redmond, WA (US); Chris Huybreqts, Redmond, WA (US); Jaeyoun Kim, Redmond, WA (US); Thomas C. Butcher, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/336,847

(22) Filed: Jul. 21, 2014

(65) Prior Publication Data

US 2016/0019915 A1    Jan. 21, 2016

(51) Int. Cl.
*G10L 25/63*    (2013.01)
*G10L 19/018*    (2013.01)
(Continued)

(52) U.S. Cl.
CPC .............. *G10L 25/63* (2013.01); *G10L 15/22* (2013.01); *G10L 19/018* (2013.01); *G10L 17/00* (2013.01);
(Continued)

(58) Field of Classification Search
CPC ........................... H04N 1/00347; G10L 25/63
See application file for complete search history.

(56) References Cited

U.S. PATENT DOCUMENTS 6,353,810 B1    3/2002    Petrushin
7,222,075 B2    5/2007    Petrushin
(Continued)

FOREIGN PATENT DOCUMENTS

WO    9520216 A1    7/1995

OTHER PUBLICATIONS

Vogt, et al., "EmoVoice—A Framework for Online Recognition of Emotions from Voice", In Proceedings of the 4th IEEE tutorial and research workshop on Perception and Interactive Technologies for Speech-Based Systems, Perception in Multimodal Dialogue Systems, Jun. 2008, 12 pages.
(Continued)

*Primary Examiner* — Lennin RodriguezGonzale
(74) *Attorney, Agent, or Firm* — Shook, Hardy & Bacon L.L.P.

(57) ABSTRACT

Systems, methods, and computer-readable storage media are provided for recognizing emotion in audio signals in real-time. An audio signal is detected and a rapid audio fingerprint is computed on a user's computing device. One or more features is extracted from the audio fingerprint and compared with features associated with defined emotions to determine relative degrees of similarity. Confidence scores are computed for the defined emotions based on the relative degrees of similarity and it is determined whether a confidence score for one or more particular emotions exceeds a threshold confidence score. If it is determined that a threshold confidence score for one or more particular emotions is exceeded, the particular emotion or emotions are associated with the audio signal. As desired, various action then may be initiated based upon the emotion/emotions associated with the audio signal.

20 Claims, 6 Drawing Sheets

(51) Int. Cl.
*G10L 15/22* (2006.01)
*G10L 17/00* (2013.01)
*G10L 25/78* (2013.01)

(52) U.S. Cl.
CPC ........ *G10L 25/78* (2013.01); *G10L 2015/227* (2013.01)

(56) References Cited

U.S. PATENT DOCUMENTS

| | | | |
|---|---|---|---|
| 7,340,393 B2 | 3/2008 | Mitsuyoshi | |
| 8,209,182 B2 | 6/2012 | Narayanan | |
| 8,214,214 B2 | 7/2012 | Bennett | |
| 8,595,005 B2 | 11/2013 | Krishnan et al. | |
| 2003/0055532 A1* | 3/2003 | Sakagami | G06N 3/008 700/245 |
| 2004/0198382 A1* | 10/2004 | Wong | H04B 1/3827 455/456.1 |
| 2007/0033040 A1* | 2/2007 | Huang | G06F 17/2755 704/254 |
| 2007/0192103 A1 | 8/2007 | Sato et al. | |
| 2010/0003969 A1* | 1/2010 | Isobe | H04M 3/533 455/412.1 |
| 2013/0297297 A1 | 11/2013 | Guven | |
| 2014/0172431 A1* | 6/2014 | Song | G10L 25/63 704/275 |
| 2014/0330566 A1* | 11/2014 | Redfern | G10L 17/005 704/246 |

OTHER PUBLICATIONS

"Smartphones Might Soon Develop Emotional Intelligence: Algorithm for Speech-Based Emotion Classification Developed", Published on: Dec. 4, 2012, Available at: http://www.sciencedaily.com/releases/2012/12/121204081324.htm?+Math+News+--+Communications).

Morrison, et al., "Real-time Spoken Affect Classification and its Application in Call-Centres", In Proceedings of Third International Conference on Information Technology and Applications, Jul. 4, 2005, 5 pages.

"International Search Report & Written Opinion Received for PCT Application No. PCT/US2015/040671", dated Sep. 29, 2015, 11 Pages.

* cited by examiner

REAL-TIME EMOTION RECOGNITION FROM AUDIO SIGNALS

BACKGROUND

Human speech is more than simply the spoken words. It is also about how those words were spoken; audio signals resulting from, accompanying, and/or utilized in place of spoken words; and even the identity of the speaker who spoke them. In other words, a lot of human communication takes place in the non-semantic characteristics of a speaker's speech and speech patterns. The speaker's emotions add layers of contextual connotations that influence a listener's response, even resulting in different interpretations from the same words. For instance, hearing the word "hurry" spoken at a speaker's normal volume might do little to alter the listener's timeline while hearing the word "HURRY!" spoken at an inflated volume and with anxiety in the speaker's tone may cause the listener to drop everything and run.

Yet despite today's ubiquity of smart devices, their user interfaces can at best only understand semantic speech and, accordingly, are unable to comprehend let alone act upon the richer meaning conveyed by speech.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for recognizing emotion in audio signals in real-time. An audio signal (e.g., human speech and/or audio signals resulting from human speech) is detected and a rapid audio fingerprint is computed on a user's computing device (e.g., a mobile computing device). One or more features is extracted from the audio fingerprint and compared with features associated with defined emotions to determine relative degrees of similarity. Confidence scores are computed for the defined emotions based on the relative degrees of similarity and it is determined whether a confidence score for one or more particular emotions exceeds an associated threshold confidence score. If it is determined that a threshold confidence score associated with one or more particular emotions is exceeded, one or more of the particular emotions is associated with the audio signal. As desired, various action then may be initiated based upon the emotion or emotions associated with the audio signal.

Embodiments of the present invention provide an environment that is continuously listening for audio signals so that such signals, when received, may be detected in real-time. With a real-time, continuous understanding of the emotional state of a speaker, several scenarios may be unlocked ranging from assistance to personalization, to simply making the speaker aware of the emotion they themselves are portraying while speaking. Such understanding provides for improved accuracy and reduced error rate, thus resulting in improved efficiency in carrying out processes reliant on audio detection and interpretation.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
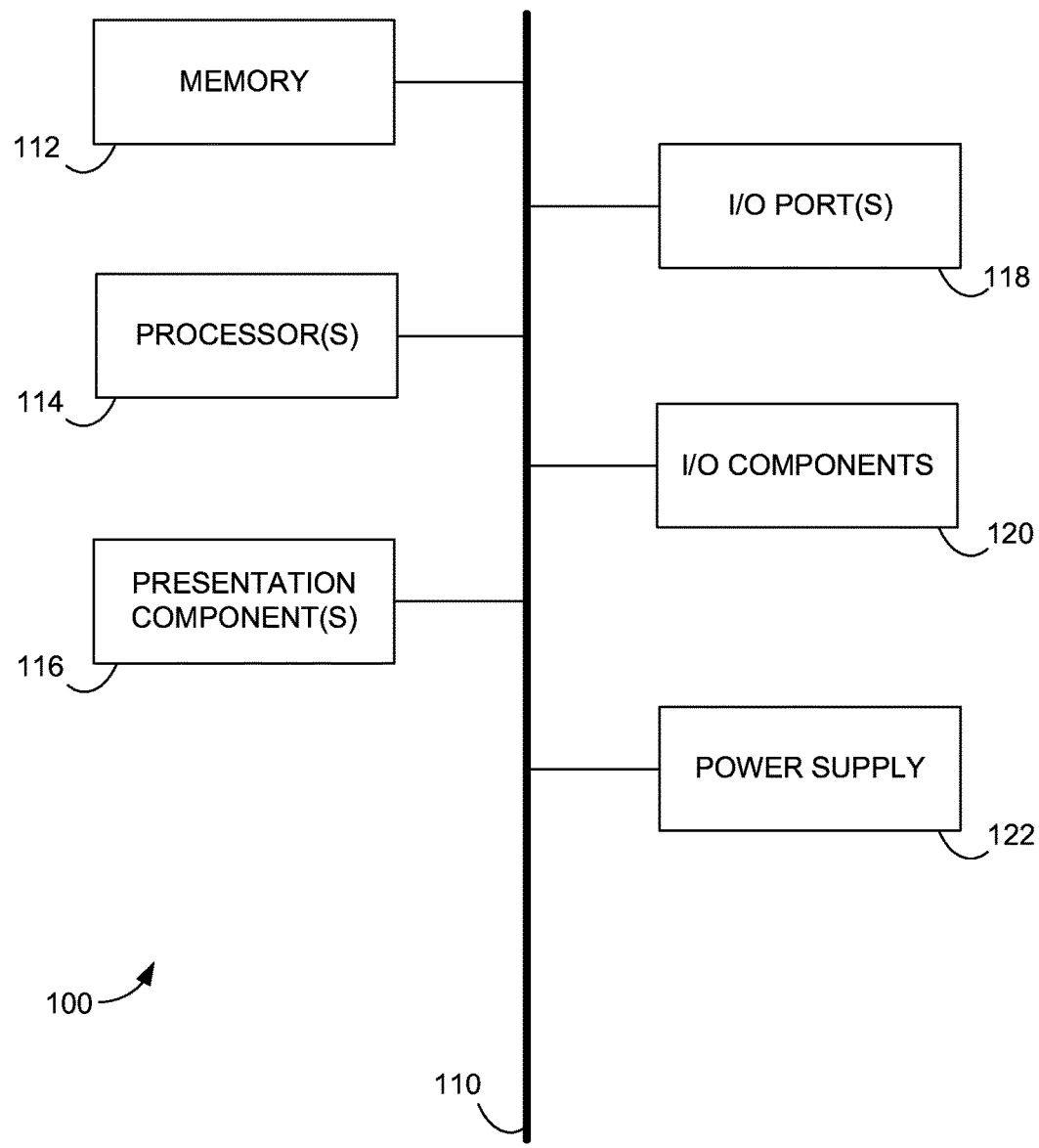
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for recognizing emotion in audio signals in real-time. An audio signal (e.g., human speech and/or audio signals resulting from human speech) is detected by a continuously listening microphone and a rapid audio fingerprint is computed on a user's computing device (e.g., a mobile device). The computed audio fingerprint is a representation of sound pressure over time and is unique to each audio signal. One or more features are extracted from the audio fingerprint to create a digital summary of some of the particular audio signal's attributes. Exemplary features include, by way of example only and not limitation, frequency-time representation, variance of speech by amplitude, variance of speech by pacing of words, zero crossing rate, fundamental estimation and its derivative, spectral distribution of the signal, ratio of voiced/unvoiced signal in speech, and prosody of speech.

The extracted features are compared with features in a data store that are associated with defined emotions (either aggregated from a plurality of speakers or specific to the speaker from whom the audio signal was detected) to determine relative degrees of similarity. Confidence scores are computed for one or more defined emotions (depending on the application or embodiment being utilized) based on the relative degrees of similarity, the confidence scores representing how confidently it appears that the speaker of the audio signal is experiencing the associated defined emotion or emotions. It is determined whether a confidence score for one or more particular emotions exceeds an associated threshold confidence score. If it is determined that a threshold confidence score for one or more particular emotions is exceeded, the particular emotion or emotions are associated with the audio signal.

Accordingly, one embodiment of the present invention is directed to one or more computer-readable storage media storing computer-useable instructions that, when used by one or more computing devices, cause the one or more computing devices to perform a method for recognizing emotion in audio signals. The method includes detecting an audio signal, computing an audio fingerprint from the detected audio signal, computing confidence scores for one or more of a plurality of defined emotions based upon the audio fingerprint, and associating one or more emotions with the audio signal based upon the computed confidence scores.

In another embodiment, the present invention is directed to a method being performed by one or more computing devices including at least one processor, the method for recognizing emotion in audio signals. The method includes detecting an audio signal, computing an audio fingerprint from the detected audio signal, extracting at least one feature from the audio fingerprint, comparing the extracted at least one feature with features associated with a plurality of defined emotions to determine relative degrees of similarity, computing confidence scores for one or more of the plurality of defined emotions based upon the determined relative degrees of similarity, determining that the confidence score computed for one or more particular emotions of the plurality of defined emotions exceeds a confidence score threshold, and associating the particular one or more of the plurality of defined emotions with the audio signal.

In yet another embodiment, the present invention is directed to a system including a microphone that detects audio signals, an emotion identification engine having one or more processors and one or more computer-readable storage media, and a data store coupled with the emotion identification engine. The emotion identification engine is configured to receive an audio signal detected from the microphone, compute an audio fingerprint from the received audio signal, determine confidence scores for one or more of a plurality of defined emotions based upon the computed audio fingerprint and at least a portion of data stored in association with the data store, and associate one or more emotions with the audio signal based upon the computed confidence scores.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. In embodiments, a microphone or other source of audio stream data is included as an I/O component to provide the audio signals necessary for emotion recognition. Other illustrative I/O components include a joystick, game pad, satellite dish, scanner, printer, wireless device, a controller, such as a stylus, a keyboard and a mouse, a natural user interface (NUI), and the like.

A NUI processes air gestures, voice, or other physiological inputs generated by a user. These inputs may be interpreted as search requests, words or symbols appearing in apps available for retrieval in response to input search requests, and the like presented by the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

Furthermore, although the term "learning engine" is used herein, it will be recognized that this term may also encompass servers, web browsers, sets of one or more processes distributed on one or more computers, one or more stand-alone storage devices, sets of one or more other computing or storage devices, any combination of one or more of the above, and the like.

Figure 2:
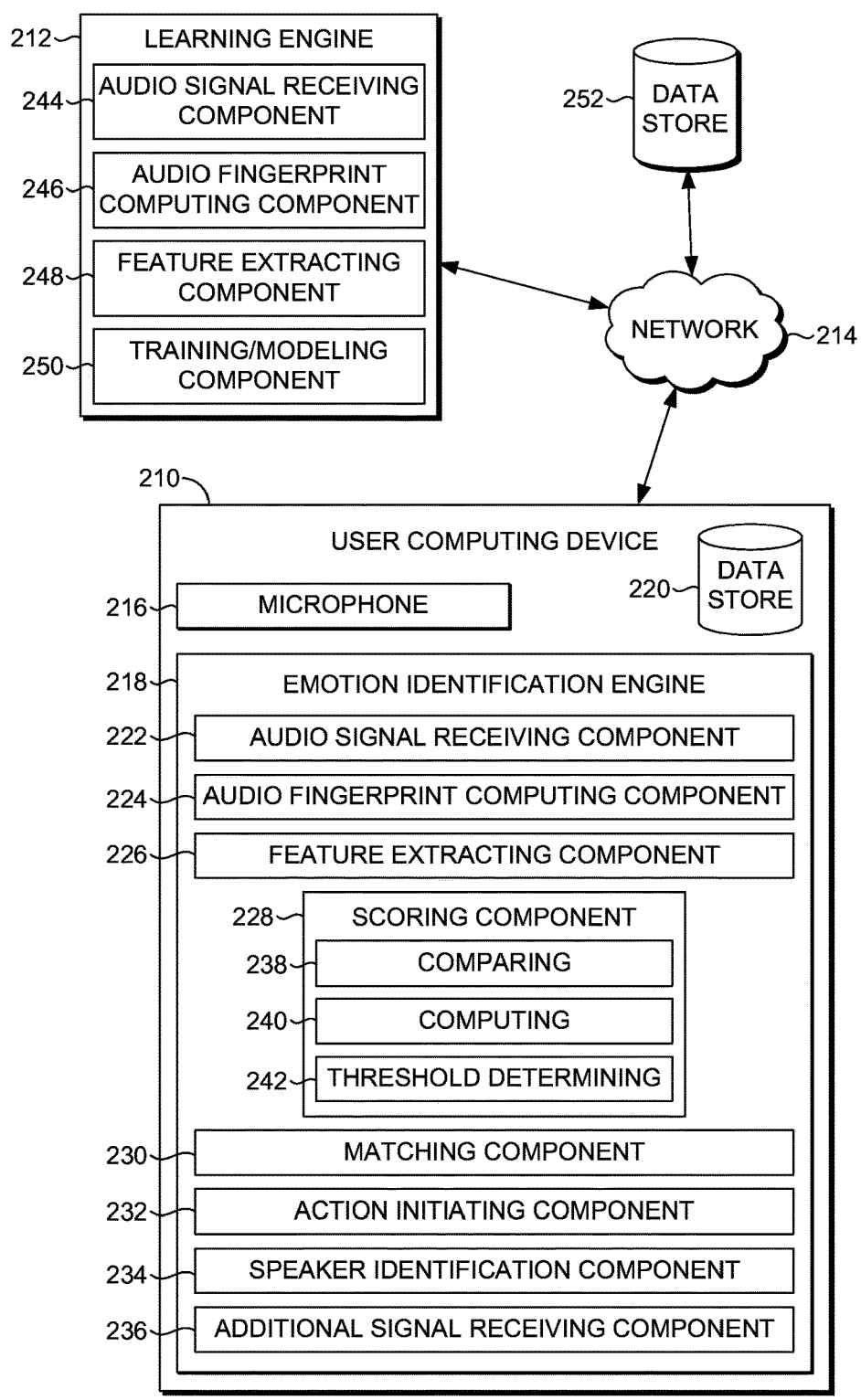
FIG. 2 is a block diagram of an exemplary computing system in which embodiments of the invention may be employed.

As previously set forth, embodiments of the present invention provide systems, methods, and computer-readable storage media for recognizing emotion in audio signals (e.g., human speech and/or audio signals resulting from or accompanying human speech) in real-time. With reference to FIG. 2, a block diagram is provided illustrating an exemplary computing system 200 in which embodiments of the present invention may be employed. Generally, the computing system 200 illustrates an environment in which audio signals are detected and audio fingerprints computed therefrom are compared with a database of audio fingerprints associated with known emotional states to determine if the emotional state of the speaker of the audio signal is recognizable. Among other components not shown, the computing system 200 generally includes a user computing device 210 and a learning engine 212 in communication with one another via a network 214. The network 214 may include, without limitation, one or more local area networks (LANs) and/or wide area networks (WANs). Such networking environments are commonplace in offices, enterprise-wide computer networks, intranets and the Internet. Accordingly, the network 214 is not further described herein. Additionally, in embodiments, the functionality described as being performed by the user computing device 210 and the learning engine 212 may be performed by a single device (e.g., the user computing device 210) rendering the network 214 unnecessary. In such embodiments, the data store 252 (more fully described below) also may be located in association with the user computing device 210. Any and all such variations, and any combination thereof, are contemplated to be within the scope of embodiments of the present invention.

It should be understood that any number of user computing devices and/or learning engines may be employed in the computing system 200 within the scope of embodiments of the present invention. Each may comprise a single device/interface or multiple devices/interfaces cooperating in a distributed environment. For instance, the learning engine 212 may comprise multiple devices and/or modules arranged in a distributed environment that collectively provide the functionality of the learning engine 212 described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via the user computing device 210, the learning engine 212, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of learning engines and/or user computing devices. By way of example only, the learning engine 212 might be provided as a single computing device, a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown and/or described, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In accordance with embodiments of the present invention, the system 200 is trained to understand the audio fingerprints and/or features, aggregate and speaker-specific, which may be associated with a plurality of defined emotions. While access to audio signals generated by various users improves the accuracy and reduces the error rate for processes reliant on audio detection, in embodiments, users may opt out of having their audio samples collected and/or stored for use in improving the results of audio detection processes. For instance, users may opt out of audio signal collection via a user interface (not shown) accessible via a "settings" option or the like. Alternatively, when accessing an audio detection application (or via a "settings" option or the like), users may be asked to opt in to emotion detection via collection and possible storage of audio signals for improving the output of audio detection applications. Any and all such variations, and any combination thereof, are contemplated to be within the scope of embodiments of the present invention.

In embodiments, training the system 200 may be accomplished with a machine learning approach in which data (audio samples) are collected and human-generated tags are attached to each segment of the audio samples. In this regard, the learning engine 212 of the computing system 200 of FIG. 2 is configured to, among other things, receive training audio signals, compute training audio fingerprints, extract features from the training audio fingerprints and receive human-generated tags to attach to the various features for storage. As illustrated, the learning engine 212 has access to a data store 252. The data store 252 is configured to store information related to at least one of audio fingerprints, audio fingerprint features, defined emotions or emotional states as they relate to audio fingerprints and features, and the like. In embodiments, the data store 252 is configured to be searchable for one or more of the items stored in association therewith. It will be understood and appreciated by those of ordinary skill in the art that the information stored in association with the data store may be configurable and may include any information relevant to, by way of example only, audio fingerprints, audio fingerprint features, defined emotions, and the like. The content and volume of such information are not intended to limit the scope of embodiments of the present invention in any way. Further, the data store 252 may be a single, independent component (as shown) or a plurality of storage devices, for instance a database cluster, portions of which may reside in association with the learning engine 212, the user computing device 210, another external computing device (not shown), and/or any combination thereof.

As illustrated, the learning engine 214 includes an audio signal receiving component 244, an audio fingerprint computing component 246, a feature extracting component 248, and a training/modeling component 250. The audio signal receiving component 244 is configured to receive a plurality of training audio signals (human speech) as either raw audio bytes or as pre-computed fingerprints. It should be noted that if audio is received by the learning engine 212 as pre-computed fingerprints (generally computed out-of-band independent of the learning engine 212), the audio fingerprint computing component 246 may be omitted from the learning engine 214.

The audio fingerprint computing component 246 is configured to compute, from the training audio signals, an audio fingerprint associated with each training audio signal. Each computed audio fingerprint is unique to the audio sample from which it is computed. The feature extracting component 248 is configured to extract, from the audio fingerprints, features associated with the audio fingerprint. Such features may include, by way of example and not limitation, frequency-time representation, variance of speech by amplitude, variance of speech by pacing of words, zero crossing rates, fundamental estimation and its derivative, spectral distribution of the audio signal, ratio of voiced/unvoiced signals in speech, and prosody of speech. It will be understood by those or ordinary skill in the art that audio fingerprints may be computed out-of-band and received by the audio signal receiving component 244 as previously set forth. In such instances, the audio fingerprint computing component 246 may be omitted or remain dormant during one or more stages of processing the audio signal in question.

The training/modeling component 250 of the learning engine 212 is configured to examine the features extracted from the audio fingerprints of the respective audio samples and associate human generated tags therewith, each tag being indicative of one or more emotions represented by the set of features. In other words, the tags are representative of the likely emotion or emotions of the speaker of the audio signal from which the audio fingerprint and corresponding audio features were computed/extracted.

The extracted, computed, and tagged information is then stored in association with a data store, e.g., the data store 252, for comparison against when real-time audio signals are received. In embodiments, training and modeling may be a continuous process whereby the data store of information is continuously improved to aid in insuring the best possible accuracy when assessing an audio signal sample.

Figure 3:
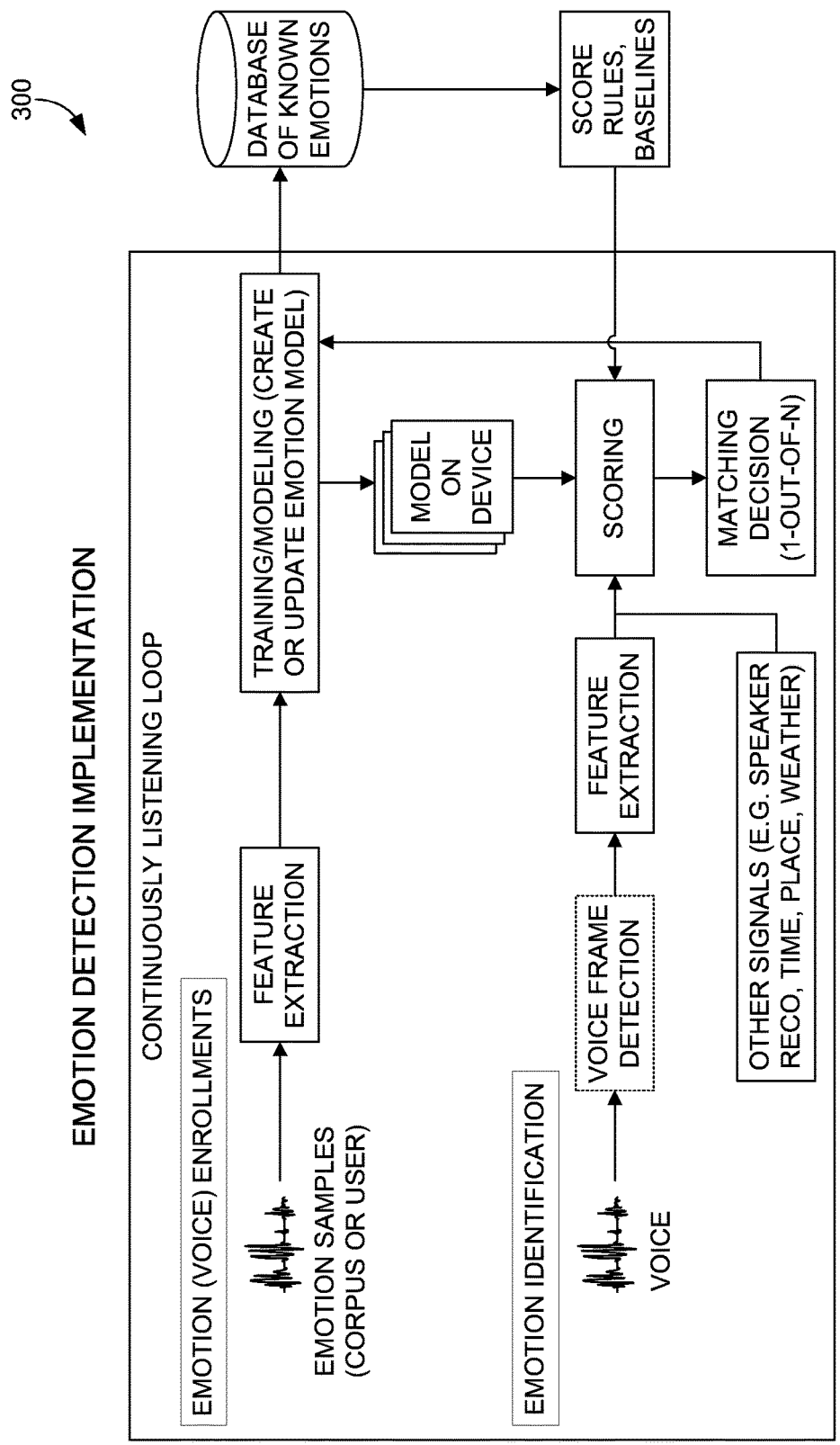
FIG. 3 is a block diagram showing an exemplary implementation scenario, in accordance with an embodiment of the present invention.

The user computing device 210 is configured to, among other things, detect audio signals, classify the detected audio signals against a data store of known emotions, and associate one or more likely emotions of the speaker with the detected audio signals. The user computing device 210 may include any type of computing device, such as the computing device 100 described with reference to FIG. 1, for example. As illustrated, the user computing device 210 includes a microphone 216 and an emotion identification engine 218. The microphone is configured to detect, in real-time, audio signals resulting from human speech. In this regard, the microphone may be an "always on" device that is operable in a low-powered state when no audio signals are detected and that is capable of quickly powering up as needed upon audio signal detection. In embodiments, a sensor such as a voice frame detection component (as shown in FIG. 3) may operate in conjunction with the microphone 216 to sense audio signals and indicate to the microphone 216 to begin audio signal detection. In other words, in embodiments, a voice frame detection component (as shown in FIG. 3) may sense the presence of an audio signal and indicate to the microphone 216 to begin detecting the nature of the audio signal such that its audio fingerprint may be computed and features extracted therefrom, as more fully described below.

The emotion identification engine 218 is configured to, among other things, classify received audio signals in accordance with a data store of known emotions in an attempt to ascertain the emotional state of a speaker of a received audio signal. In this regard, the emotion identification engine 218 includes an audio signal receiving component 222, an audio fingerprint computing component 224, a feature extracting component 226, a scoring component 228, a matching component 230, an action initiating component 232, a speaker identification component 234 and an additional signal receiving component 236.

The audio signal receiving component 222 is configured to receive, e.g., from the microphone 216, a detected audio signal. The audio fingerprint computing component 224 is configured to compute an audio fingerprint from the received audio signal. The computed audio fingerprint is a representation of sound pressure over time and is unique to each audio signal. From the audio fingerprint, the feature extracting component 226 is configured to extract one or more features to create a digital summary of some of the particular audio signal's attributes. Exemplary features include, by way of example only and not limitation, frequency-time representation, variance of speech by amplitude, variance of speech by pacing of words, zero crossing rate, fundamental estimation and its derivative, spectral distribution of the signal, ratio of voiced/unvoiced signal in speech, and prosody of speech.

The scoring component 228 of the emotion identification engine 218 is configured to determine confidence scores for a plurality of defined emotions which, as previously set forth, may be application or embodiment-specific. In this regard, the scoring component 228 includes a comparing sub-component 238, a computing sub-component 240, and a threshold determining sub-component 242. The comparing sub-component 238 is configured to compare the features extracted from the audio signal (by the feature extracting component 226) with known features associated with a plurality of defined emotions stored in a data store (data store 220, as illustrated). Each particular emotion of the plurality of defined emotions includes various characteristics represented by its features. The more of those defining features an audio signal includes in common with a particular emotion, the more likely it is that the speaker of the audio signal is experiencing that particular emotion. Based upon the comparison conducted by the comparing sub-component 238, the computing sub-component 240 computes a confidence score for one or more of the plurality of defined emotions. While scales may be defined in any number of ways within embodiments of the present invention, in one simplistic embodiment, the higher the confidence score for one or more particular emotions of the plurality of defined emotions, the more likely it is that the speaker of the audio signal is experiencing that particular emotion or emotions.

It is likely that a number of emotions have at least a portion of their corresponding features in common with one another. As such, it is likely that a number of emotions will have a confidence score exceeding neutral as computed by the computing sub-component 240 of the scoring component 228 of the emotion identification engine 218. It is also likely that different speakers will have emotions that vary widely in their feature registration. Accordingly, the threshold determining sub-component 242 of the scoring component 228 is configured to determine whether the computed confidence score (computed by the computing sub-component 240) associated with any of the plurality of defined emotions exceeds a threshold value. Threshold values may be based on aggregate audio fingerprints from a plurality of speakers from whom audio samples were gathered while they were experiencing that particular emotion or they may be specific to the individual speaker from whom the audio signal is received, as more fully described below. Any and all such variations, and any combination thereof, are contemplated to be within the scope of embodiments of the present invention.

The matching component 230 is configured to associate one or more emotions with the audio signal based upon the computed confidence scores and whether or not one or more confidence score thresholds has been met or exceeded. An emotion associated with the audio signal indicates a high likelihood that the speaker of the audio signal was experiencing the associated emotion when the audio signal was spoken. In embodiments, more than one emotion may be associated with a single audio input (e.g., tired and irritable).

The action initiating component 232 is configured to initiate any of a number of different actions in response to associating one or more emotions with an audio signal. For instance, the likely emotional state of a speaker may be conveyed to other individuals with whom the speaker is interacting (e.g., other parties to an Instant Messaging conversation, or the like). In this instance, knowing more about the emotional state of the individual to whom one is speaking may help alleviate some communication challenges that can occur when parties are speaking with one another without the benefit of non-semantic signals generated during the conversation. In another example, an individual may be dictating an email message to another party and the system 200 may associate an emotion of "anger" with his/her tone in dictating. Upon the individual seeking to send the message, the system 200 may prompt the speaker with an "are you sure?" type of message or more passively with a delayed send to help ensure the speaker really wanted the message to go out when he or she was in an angered state upon composing.

In yet another example, if the system 200 associates an emotion of sadness from an individual, the color theme and/or the avatar on her associated computing device may be automatically changed to reflect her mood. Or, songs from a playlist that have a calming or energizing effect may be recommended to an individual based upon his or her perceived mood. Persons having frequent anxiety or stress may be monitored by their computing devices for indicators of overactive emotional states. Potential business partners may become nervous when speaking about a particular portion of their proposals, such nervousness being detected by the system and relayed to the user. More general feedback from an audience of listeners/speakers may also be aggregated and provided subsequent to a presentation to provide useful information that may be incorporated the next time the presentation is provided.

As is evident, the possibilities are almost endless. Embodiments of the invention permit non-semantic feedback where otherwise only semantic feedback conveying significantly less information is available. Such non-semantic feedback provides immense opportunity for changes in human behavior to take into account such non-semantic feedback. The actions that may be initiated by the action initiating component 232 are limited only by the imagination of the programming user.

As previously set forth, confidence score thresholds may be based upon an aggregate of a plurality of speakers or may be specific to a particular speaker. Thus, it can be seen that the accuracy of the system 200 may be enhanced where the identity of the speaker originating the audio signal is known. Thus, assuming appropriate permissions, the speaker identification component 234 is configured to compare the audio fingerprint computed from a received audio signal (by the audio fingerprint computing component) and compare the audio fingerprint to a plurality of known audio fingerprints (for instance, stored in association with the data store 220), to determine if the identification of the speaker can be determined. If the speaker's identity can be determined, speaker-specific thresholds may be utilized for confidence scores, as previously set forth.

Another way to enhance the accuracy of the system 200 is to take into account external factors, that is, non-audio signals that may be gleaned from the speaker's context. For instance, temporal, geospatial, or geophysical signals (e.g., season, weather, location, temperature, GPS data, etc.) may affect a speaker's emotional state. Enhancing the emotion identification engine 218 with one or more of these non-audio signals may significantly improve the accuracy with which a likely emotion of the speaker may be identified.

It should be noted that embodiments of the present invention are equally applicable to mobile computing devices and devices accepting gesture, touch and/or voice input. Any and all such variations, and any combination thereof, are contemplated to be within the scope of embodiments of the present invention. It should further be noted that embodiments of the present invention may be utilized both while connected to a network of information and while not connected to a network of information. If not connected, the user computing device 210 includes all components required for recognizing emotions from received audio signals. When running locally on a non-connected computing device, a specialized silicon chip may be utilized that runs continuously in a low-powered state and does not require the device to be connected to be active. In embodiments, the specialized silicon chip may have the singular purpose of detecting emotion from audio signals in accordance with embodiments hereof and outputting a signal which indicates one or more of a fixed set of emotional states that changes as the emotion/input changes. The signal then may become available to the more general computing environment for other programs to run utilizing the output emotion information.

Turning now to FIG. 3, a block diagram is illustrated showing an exemplary emotion detection implementation 300, in accordance with an embodiment of the present invention. Inside the "Continuously Listening Loop" are a first or top flow line and a second or bottom flow line. The top flow line represents the training aspect of embodiments of the present invention. It will be understood and appreciated by those of ordinary skill in the art that embodiments of the present invention may conduct training of the system offline rather than as an active adaptation which attempts to learn from users as part of a continuous learning loop, as shown. In such embodiments, the top flow line may be omitted from the system 300.

Initially, emotion (voice) enrollments, that is, the audio samples utilized to train the system, are received. These samples represent the audio samples which may be an aggregate corpus or user-specific. From these samples, audio fingerprints are computed and features are extracted as indicated. The system 300 is then trained/modeled to create or update the emotion model. The features and associated tagged emotions are stored in the database of known emotions and in the model (database) on the device itself.

The second or bottom flow line represents the real-time detection and classification of audio signals as representative of defined emotions. Initially, audio (voice) signals are received. This triggers a "voice frame detection" sensor that lets the associated microphone know that it is to begin detecting audio signals. The signals are detected, audio fingerprints are computed and features are extracted, as more fully described above. The features and then compared with information contained in one or both of the databases of known emotions (including the "model on device") and confidence scores are computed representing a respective likelihood that the speaker of the received audio signals was experiencing one or more particular defined emotions when the audio signal was spoken. The confidence scores are then associated with one or more emotions at the box labeled "Matching Decision," the emotion/emotions being matched from a finite number (N) of defined emotions. (The box labeled "Other Signals" is provided to take into account non-audio signals that may affect the emotional state of a speaker, as more fully described above.)

It should be noted that when running locally on a device in an unconnected state, only the second or bottom flow line need be present on the device, including the "Model on Device" data store. The box labeled "Other Signals," while enhancing the accuracy of emotions associated with an incoming audio signal, is not necessary and may not be available when the device is in an unconnected state.

Figure 4:
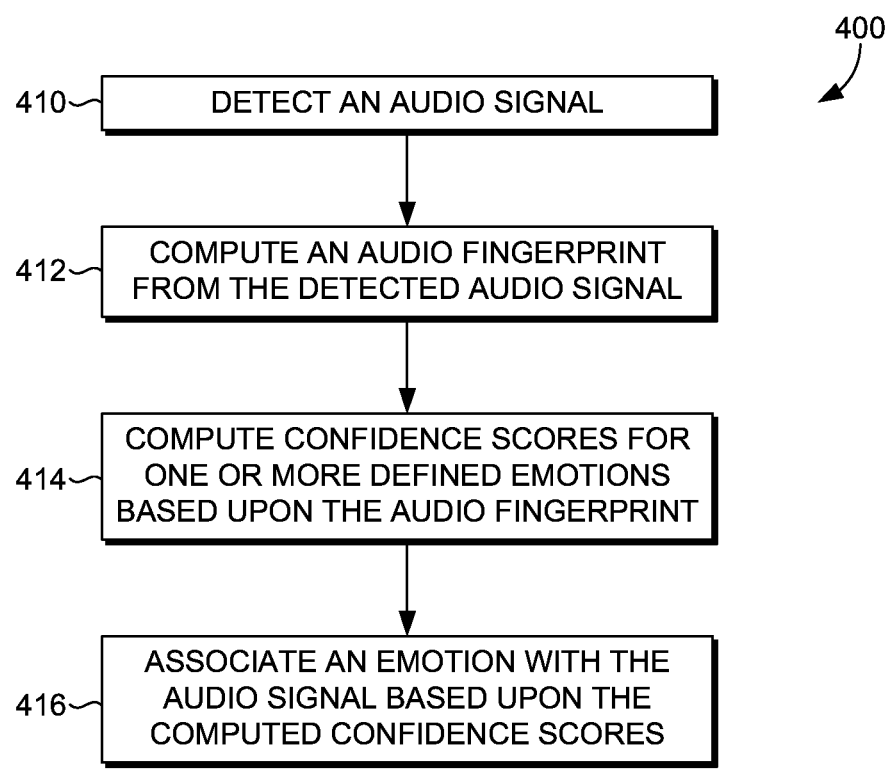
FIG. 4 is a flow diagram showing an exemplary method for recognizing emotion in audio signals, in accordance with an embodiment of the present invention.

Turning now to FIG. 4, a flow diagram is illustrated showing an exemplary method (400) for recognizing emotion in audio signals, in accordance with an embodiment of the present invention. As indicated at block 410, an audio signal (e.g., human speech and/or audio signals resulting from human speech) is detected, for instance, by the microphone 216 of the user computing device 210 of FIG. 2. An audio fingerprint is computed from the detected audio signal, as indicated at block 412 (for instance, utilizing the audio fingerprint computing component 224 of the emotion identification engine 218 of FIG. 2). Confidence scores for one or more defined emotions are computed, as indicated at block 414, based upon the computed audio fingerprint. This may be done, for instance, utilizing the scoring component 228 of the emotion identification engine 218 of FIG. 2. One or more emotions are associated with the audio signal based upon the computed confidence scores, as indicated at block 416, e.g., utilizing the matching component 230 of the emotion identification engine 218 of FIG. 2.

Figure 5:
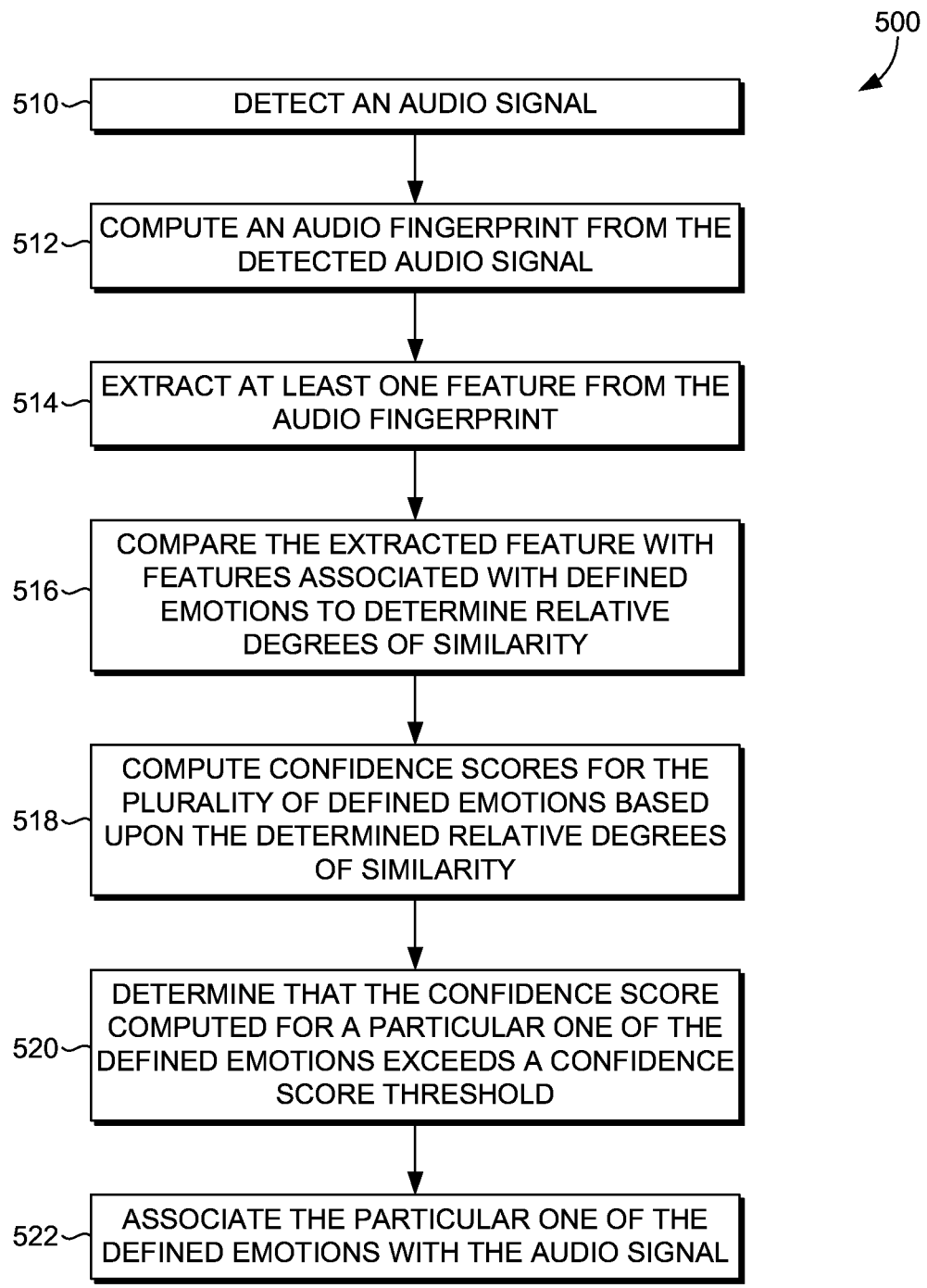
FIG. 5 is a flow diagram showing another exemplary method for recognizing emotion in audio signals, in accordance with an embodiment of the present invention.

With reference to FIG. 5, a flow diagram is illustrated showing another exemplary method (500) for recognizing emotion in audio signals, in accordance with an embodiment of the present invention. As indicated at block 510, an audio signal is detected, e.g., utilizing the microphone 216 of the user computing device 210 of FIG. 2. An audio fingerprint is computed from the detected audio signal, for instance, utilizing the audio fingerprint computing component 224 of the emotion identification engine 218 of FIG. 2. This is indicated at block 512.

At least one feature is extracted from the computed audio fingerprint, e.g., utilizing the feature extracting component 226 of the emotion identification engine 218 of FIG. 2. This is indicated at block 514. The extracted feature is compared with features associated with a plurality of defined emotions to determine relative degrees of similarity, as indicated at block 516. This may be done, for instance, utilizing the comparing sub-component of the scoring component 228 of the emotion identification engine 218 of FIG. 2. Confidence scores are computed for the plurality of defined emotions based upon the determined relative degrees of similarity, as indicated at block 518. This may be done, for instance, utilizing the computing sub-component 240 of the scoring component 228 of the emotion identification engine 218 of FIG. 2.

It is next determined that the confidence score computed for one or more particular emotions of the defined emotions exceeds a confidence score threshold, for instance, by the threshold determining sub-component 242 of the scoring component 228 of the emotion identification engine 218 of FIG. 2. This is indicated at block 520. The one or more particular emotions of the defined emotions are associated with the audio signal, for instance, utilizing the matching component 230 of the emotion identification engine 218 of FIG. 2. This is indicated at block 522.

Figure 6:
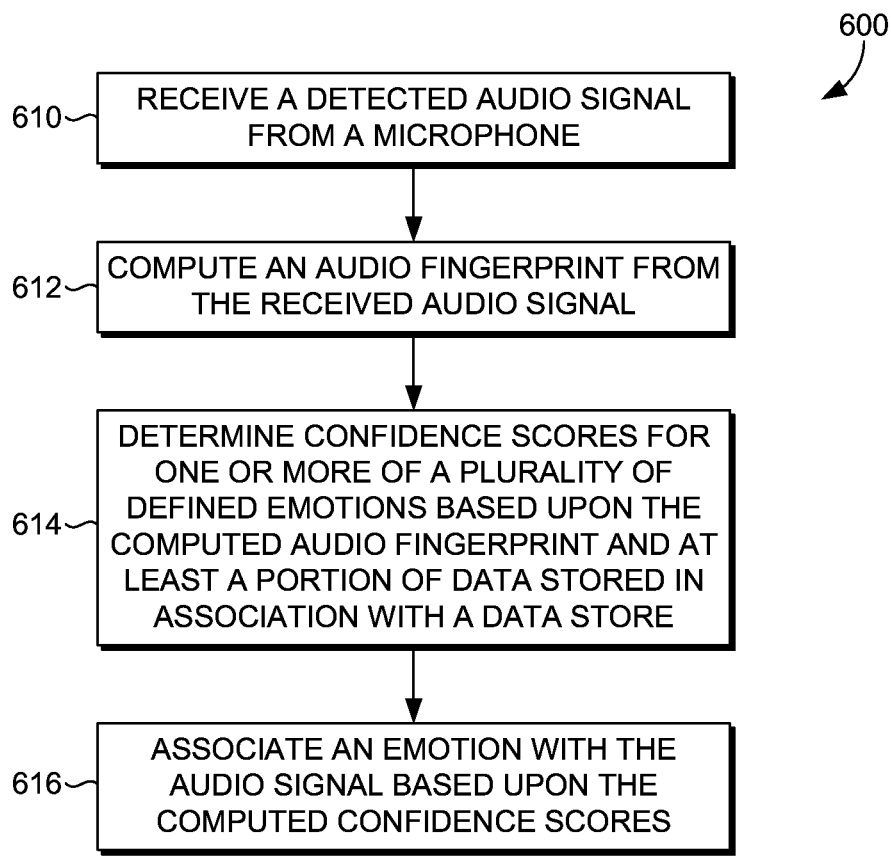
FIG. 6 is a flow diagram showing yet another exemplary method for recognizing emotion in audio signals, in accordance with an embodiment of the present invention.

With reference to FIG. 6, a flow diagram is illustrated showing yet another exemplary method (600) for recognizing emotion in audio signals, in accordance with an embodiment of the present invention. As indicated at block 610, a detected audio signal is received from a microphone (e.g., microphone 216 of FIG. 2), for instance, by the audio signal receiving component 222 of the emotion identification engine 218 of FIG. 2. An audio fingerprint is computed from the received audio signal, as indicated at block 612. This may be done, for instance, utilizing the audio fingerprint computing component 224 of the emotion identification engine 218 of the user computing device 210 of FIG. 2. Confidence scores are then determined for one or more of a plurality of defined emotions based upon the computed audio fingerprint and at least a portion of data stored in association with a data store, e.g., the data store 220 of the user computing device 210 of FIG. 2, as indicated at block 614. This may be done, for instance, utilizing the scoring component 228 of the emotion identification engine 218 of FIG. 2. One or more emotions are then associated with the audio signal based upon the computed confidence scores, for instance, utilizing the matching component 230 of the emotion identification engine 218 of FIG. 2. This is indicated at block 616.

As can be understood, embodiments of the present invention provide systems, methods, and computer-readable storage media for, among other things, recognizing emotion in audio signals in real-time. An audio signal (e.g., human speech and/or audio signals resulting from human speech) is detected and a rapid audio fingerprint is computed on a user's computing device (e.g., a mobile computing device). One or more features is extracted from the audio fingerprint and compared with features associated with defined emotions to determine relative degrees of similarity. Confidence scores are computed for the defined emotions based on the relative degrees of similarity and it is determined whether a confidence score for one or more particular emotions of the defined emotions exceeds a threshold confidence score. If it is determined that a threshold confidence score for one or more particular emotions of the emotions is exceeded, the particular emotion or emotions are associated with the audio signal. As desired, various actions then may be initiated based upon the emotion/emotions associated with the audio signal.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 400 of FIG. 4, 500 of FIG. 5, and 600 of FIG. 6 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer storage devices storing computer-useable instructions that, when used by one or more computing devices, cause the one or more computing devices to perform a method for recognizing emotion in audio signals, the method comprising:
   detecting an audio signal corresponding to speech by a speaker;
   computing an audio fingerprint from the audio signal, the audio fingerprint being a representation of sound pressure over time;
   receiving context information associated with the audio signal, the context information comprising a non-audio signal;
   based on the audio fingerprint and the context information, computing confidence scores for one or more defined emotions, each confidence score indicating a likelihood that the speaker is experiencing a respective one of the one or more defined emotions;
   determining a confidence score threshold that is associated with an identity of the speaker, wherein confidence score thresholds vary among different speakers;
   associating an emotion of the one or more defined emotions with the audio signal based on the confidence score for the emotion satisfying the confidence score threshold; and
   initiating an action based on the emotion associated with the audio signal.

2. The one or more computer storage devices of claim 1, wherein detecting the audio signal comprises detecting a first audio signal at a first time and a second audio signal at a second time, both the first audio signal and the second audio signal being associated with a particular speaker, and wherein the confidence score threshold is determined based, at least in part, upon at least one change between the first audio signal and the second audio signal.

3. The one or more computer storage devices of claim 1, wherein the method further comprises recognizing at least one word from the audio signal, and wherein initiating the action comprises initiating the action based upon the emotion associated with the audio signal and the at least one word.

4. The one or more computer storage devices of claim 1, wherein the method further comprises:
   extracting at least one feature from the audio fingerprint; and
   comparing the at least one feature with features associated with the one or more defined emotions to determine relative degrees of similarity.

5. The one or more computer storage devices of claim 4, wherein computing confidence scores for the one or more defined emotions comprises computing confidence scores for the one or more defined emotions based upon the relative degrees of similarity.

6. The one or more computer storage devices of claim 4, wherein the features associated with the one or more defined emotions are aggregated based upon a plurality of speakers from whom audio fingerprints have been extracted.

7. The one or more computer storage devices of claim 4, wherein the method further comprises identifying the speaker of the audio signal based upon the audio fingerprint.

8. The one or more computer storage devices of claim 7, wherein the features associated with the one or more defined emotions are specific to the identified speaker.

9. A method being performed by one or more computing devices including at least one processor, the method for recognizing emotion in audio signals, the method comprising:
   detecting an audio signal corresponding to speech by a speaker;
   computing an audio fingerprint from the audio signal, the audio fingerprint being a representation of sound pressure over time;
   extracting at least one feature from the audio fingerprint;
   comparing the at least one feature with features associated with a plurality of defined emotions to determine relative degrees of similarity;
   receiving context information associated with the audio signal, the context information comprising a non-audio signal;
   based on the relative degrees of similarity and the context information, computing confidence scores for one or more of the plurality of defined emotions with respect to the audio signal, the confidence scores indicating a likelihood that the speaker is experiencing the one of the one or more of the plurality of defined emotions;
   determining a confidence score threshold that is associated with an identity of the speaker, wherein confidence score thresholds vary among different speakers;
   determining that a respective confidence score computed for an emotion of the plurality of defined emotions exceeds the confidence score threshold;
   based on the respective confidence score satisfying the confidence score threshold, associating the emotion of the plurality of defined emotions with the audio signal; and
   initiating an action based on the emotion associated with the audio signal.

10. The method of claim 9, wherein the at least one feature extracted from the audio fingerprint and the features associated with the plurality of defined emotions include one or more of a frequency-time representation; variance of speech by amplitude, variance of speech by pacing of words, zero-crossing rate, fundamental estimation and its derivative, spectral distribution of the audio signal, ratio of voiced/unvoiced signal in speech, and prosody of speech.

11. The method of claim 9, further comprising recognizing at least one word from the audio signal, and wherein initiating the action comprises initiating the action based upon the emotion associated with the audio signal and the at least one word.

12. The method of claim 9, wherein the features associated with the plurality of defined emotions are aggregated based upon a plurality of speakers from whom audio fingerprints have been extracted.

13. The method of claim 9, further comprising identifying the speaker of the audio signal based upon the computed audio fingerprint, wherein the features associated with the plurality of defined emotions are specific to the identified speaker.

14. The method of claim 9, wherein the action comprises selecting a song to be played based on the emotion.

15. A system comprising:
   one or more processors; and
   one or more computer storage media storing computer-executable instructions that, when executed by the one or more processors, implement a method comprising:
      receiving an audio signal that is detected by a microphone, the audio signal corresponding to speech by a speaker,
      determining an audio fingerprint based on the audio signal,
      receiving context information associated with the audio signal, the context information comprising a non-audio signal,
      based on the audio fingerprint and on the context information, determining a plurality of confidence scores for a plurality of defined emotions, each confidence score indicating a likelihood that the speaker is experiencing a respective one of the plurality of defined emotions,
      determining a confidence score threshold that is associated with an identity of the speaker, wherein confidence score thresholds vary among different speakers;
      based on a confidence score associated with a particular emotion of the plurality of defined emotions satisfying the confidence score threshold, associating the particular emotion of the plurality of defined emotions with the audio signal, and
      initiating an action based on the particular emotion associated with the audio signal.

16. The system of claim 15, wherein the non-audio signal comprises an indication of weather conditions associated with a location of the speaker.

17. The system of claim 15, wherein the non-audio signal comprises a GPS signal indicating a location of the speaker.

18. The system of claim 15, wherein the action comprises providing an indication of the particular emotion associated with the audio signal to a participant in a conversation with the speaker.

19. The system of claim 15, wherein the action comprises providing for presentation an indication of the particular emotion associated with the audio signal.

20. The system of claim 15, wherein the action comprises presenting a prompt to confirm a command to send a communication and delaying a sending of the communication.

* * * * *